(12) United States Patent
Kikuchi et al.

(10) Patent No.: US 12,100,372 B2
(45) Date of Patent: Sep. 24, 2024

(54) COMMODITY SALES DATA PROCESSING DEVICE AND METHOD

(71) Applicant: TOSHIBA TEC KABUSHIKI KAISHA, Tokyo (JP)

(72) Inventors: Jun Kikuchi, Tagata Shizuoka (JP); Hiroki Takeda, Mishima Shizuoka (JP); Yasuhiko Mochida, Numazu Shizuoka (JP)

(73) Assignee: TOSHIBA TEC KABUSHIKI KAISHA, Tokyo (JP)

(*) Notice: Subject to any disclaimer, the term of this patent is extended or adjusted under 35 U.S.C. 154(b) by 0 days.

(21) Appl. No.: 18/486,260

(22) Filed: Oct. 13, 2023

(65) Prior Publication Data

US 2024/0274103 A1  Aug. 15, 2024

(30) Foreign Application Priority Data

Feb. 14, 2023 (JP) ................. 2023-020576

(51) Int. Cl.
  *G09G 5/34* (2006.01)
  *G07G 1/00* (2006.01)
  *G09G 5/00* (2006.01)

(52) U.S. Cl.
  CPC ............. *G09G 5/34* (2013.01); *G07G 1/0009* (2013.01); *G07G 1/0036* (2013.01); *G09G 5/003* (2013.01); *G09G 2320/0257* (2013.01)

(58) Field of Classification Search
  CPC .. G09G 5/34; G09G 5/003; G09G 2320/0257; G07G 1/0009; G07G 1/0036
  See application file for complete search history.

(56) References Cited

U.S. PATENT DOCUMENTS

| 4,626,842 A | 12/1986 | Ichikawa et al. |
| 5,212,477 A * | 5/1993 | Indekeu ............... G06F 3/147 345/472 |
| 2014/0089537 A1* | 3/2014 | Jouin ................... G06F 13/32 710/24 |
| 2016/0012852 A1* | 1/2016 | Van Den Wouwer ................. H04N 21/4886 386/241 |
| 2021/0304171 A1* | 9/2021 | Kofuji ................. G07G 1/0009 |

FOREIGN PATENT DOCUMENTS

JP   3-261828   11/1991

\* cited by examiner

*Primary Examiner* — Premal R Patel
(74) *Attorney, Agent, or Firm* — Amin, Turocy & Watson, LLP

(57) ABSTRACT

A commodity sales data processing device in an embodiment includes a display unit configured to display information, first determining means for determining whether the number of characters of information that should be displayed in one row exceeds the number of characters that can be displayed in one row of the display unit, and display control means for, if the first determining means determines that the number of characters of the information that should be displayed in one row exceeds the number of characters that can be displayed in one row of the display unit, simultaneously displaying first information that can be displayed in one row of the display unit and a mark indicating that second information that should be further displayed in the same row is present and, after displaying the first information for a predetermined time, displaying the second information instead of the first information and the mark.

20 Claims, 6 Drawing Sheets

COMMODITY SALES DATA PROCESSING DEVICE AND METHOD

CROSS-REFERENCE TO RELATED APPLICATION

This application is based upon and claims the benefit of priority from Japanese Patent Application No. 2023-020576, filed on Feb. 14, 2023, the entire contents of which are incorporated herein by reference.

FIELD

Embodiments of the present disclosure relate to a commodity sales data processing device and a method.

BACKGROUND

In a store such as a volume retailer, a convenience store, or a restaurant, a store clerk of the store executes commodity registration processing and settlement processing for commodities sold in the store using a commodity sales data processing device such as a POS (Point of Sales) terminal or an ECR (Electronic Cash Register) installed in the store. The commodity sales data processing device includes a display unit for store clerks that displays information to store clerks and a display unit for customers that displays information to customers.

Since the display unit for store clerks displays various kinds of information relating to sales, a large display device is often used as the display unit for store clerks. However, the number of characters displayed by the display unit for customers is small, for example, a small display device that performs display for several rows is sometimes used as the display unit for customers.

Since the number of characters displayed in a row direction (the lateral direction) is limited, if displaying, on the display device, information, the number of characters of which exceeds the number of characters that can be displayed at a time, the small display unit for customers displays the information while scrolling the information. If the display of the display unit for customers is scrolled, it is hard to read the display because the display moves and a function of the display device cannot follow the moving display, resulting in a tailed display that leaves an afterimage. Note that, if the small display device is used as the display unit for store clerks, the same problem occurs in the display unit for store clerks.

DETAILED DESCRIPTION

In general, according to one embodiment, there is provided a commodity sales data processing device and a method that are capable of legibly displaying information, the number of characters of which exceeds the number of characters that a display unit can display at a time.

A commodity sales data processing device in an embodiment includes: a display unit configured to display information; first determining means for determining whether a number of characters of information that should be displayed in one row exceeds a number of characters that can be displayed in one row of the display unit; and display control means for, if the first determining means determines that the number of characters of the information that should be displayed in one row exceeds the number of characters that can be displayed in one row of the display unit, simultaneously displaying first information that can be displayed in one row of the display unit and a mark indicating that second information that should be further displayed in a same row is present and, after displaying the first information for a predetermined time, displaying the second information instead of the first information and the mark.

An embodiment is explained below with reference to the drawings. In the embodiment, a POS terminal is explained as an example of a commodity sales data processing device. A display unit for customers is explained as an example of the display unit. Note that the present disclosure is not limited by the explanation of the embodiment.

A POS terminal 10 executes, for a commodity to be purchased by a customer, commodity registration processing based on a commodity code, which is commodity specifying information for specifying an acquired commodity. The commodity registration processing means processing for displaying, based on a commodity code acquired from a read code symbol, commodity information such as a commodity name and a price of the commodity and storing the commodity information in a RAM or the like.

The POS terminal 10 executes settlement processing for the commodity subjected to the commodity registration processing. The settlement processing means processing for displaying, based on the commodity information of the commodity subjected to the commodity registration processing, a total amount and a change amount relating to a transaction with a customer and performing settlement.

Figure 1:
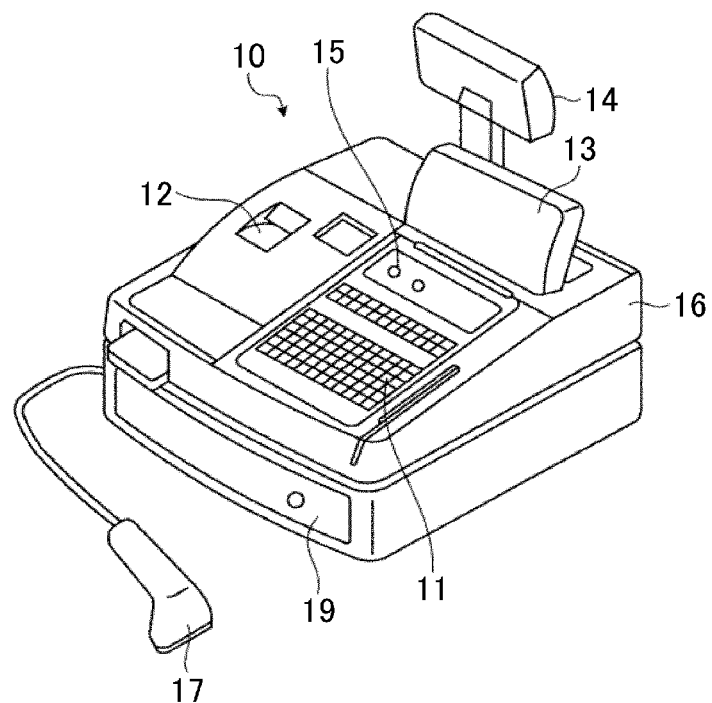
FIG. 1 is a perspective view illustrating an exterior of a POS terminal in an embodiment.

FIG. 1 is a perspective view illustrating an exterior of the POS terminal 10 in the embodiment. The POS terminal 10 includes a main body unit 16 and a money storing unit 19. The main body unit 16 incorporates a power supply unit and a circuit board and includes an operation unit 11, a printing unit 12, a display unit for store clerks 13, a display unit for customers 14, and a key switch unit 15. A reading unit 17 is connected to the main body unit 16. The money storing unit 19 includes a drawer that can be projected from and retracted into a square housing. The money storing unit 19 stores money (coins and bills) passed from the customer and money prepared by a store as change.

The operation unit 11 is a keyboard including a large number of number keys, character keys, and function keys including a closing key 111 (see FIG. 3) for ending commodity registration and declaring closing processing.

The printing unit 12 includes a thermal head and a conveying unit. The thermal head prints commodity information and settlement information on receipt paper conveyed by the conveying unit. The POS terminal 10 dispenses a receipt printed by the printing unit 12.

The display unit for store clerks 13 displays, to an operator (for example, a store clerk) who operates the POS terminal 10, commodity information of a commodity corresponding to an acquired commodity code (a commodity name, a price of the commodity, and the like), settlement information, a message, and the like. The display unit for customers 14 displays, to a customer, commodity information and a total amount of commodities subjected to commodity registration processing to that point.

The key switch unit 15 is a switch unit for inserting a key for turning on and off the POS terminal 10. If the key is inserted into the key switch unit 15 and the inserted key is turned to an ON position, the POS terminal 10 starts. If the inserted key is turned to an OFF position, the POS terminal 10 is turned off and stops.

The reading unit 17 includes a light emitting unit that is configured by an LED (Light Emitting Diode) or the like and emits light and a light receiving unit that is configured by a CCD (Charge Coupled Device) and receives light. The light emitted from the light emitting unit is reflected on a barcode attached to a commodity and the reflected light is received by the light receiving unit, whereby the reading unit 17 reads a symbol such as the barcode attached to the commodity. Note that the reading unit 17 may be configured to image and read the symbol.

Figure 2:
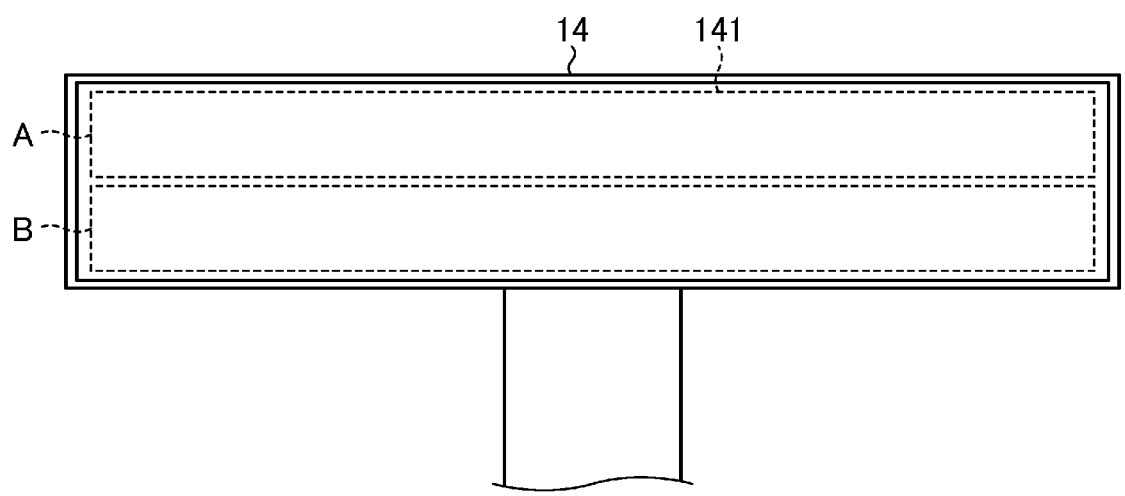
FIG. 2 is a diagram illustrating a display unit for customers.

FIG. 2 is a diagram illustrating the display unit for customers 14 of the POS terminal 10. In FIG. 2, as an example, the display unit for customers 14 includes upper and lower two stages of display regions (the upper stage is a display region A and the lower stage is a display region B). The display region A is capable of displaying information of characters for one row or marks by a predetermined number of characters at a time. The characters include hiragana, katakana, kanji, alphabets, numbers, and signs. If characters of foreign countries are displayed, the characters include languages of the countries. The predetermined number of characters (the number of characters that can be displayed in one row) is, for example, twenty. That is, the display region A is capable of displaying characters or marks up to sixteen characters at a time. Note that one mark is equivalent to one character. A blank (a space) is also equivalent to one character. Similarly, the display region B is capable of displaying, for example, characters or marks up to sixteen characters.

For example, if "Hello, welcome to the ABC store" and "Today is a bargain day!!" are displayed on the display unit for customers 14 as a message to a customer, "Hello, welcome to the ABC store" is displayed in the display region A and "Today is a bargain day!!" is displayed in the display region B. In this case, "Hello, welcome to the ABC store" includes twenty six characters, which exceed the predetermined number of characters. Therefore, in this embodiment, "Welcome to the ABC store" is divided and displayed twice in the display region A. In the first display, a mark indicating that characters to be displayed are still present is displayed in the display region A together with the first display. A detailed display method will be described below. "Today is a bargain day!!" includes sixteen characters, which are equal to or less than the predetermined number of characters. Therefore, "Today is a bargain day!!" is displayed in the display region B as it is (without being divided).

Figure 3:
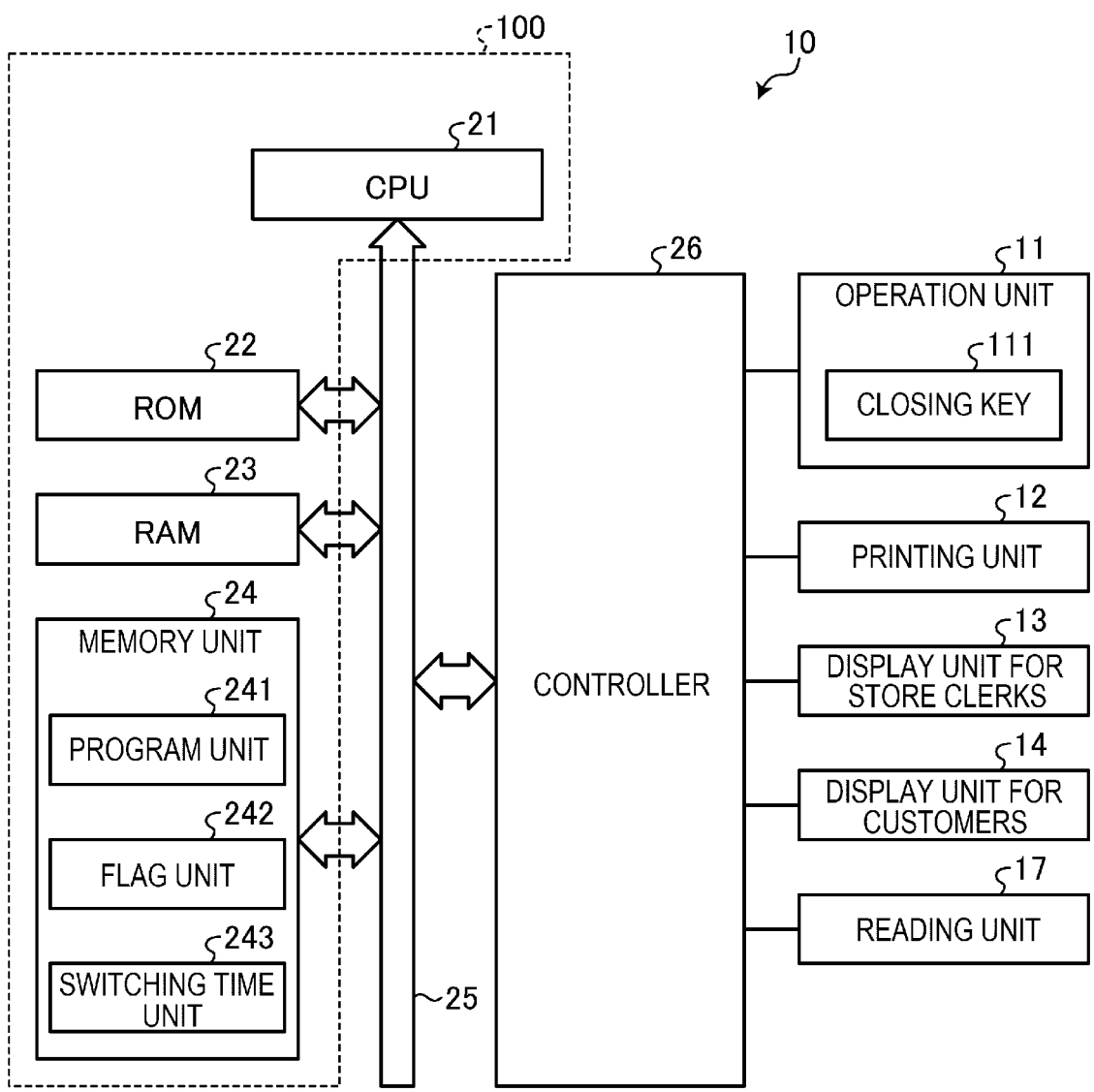
FIG. 3 is a block diagram illustrating a hardware configuration of the POS terminal.

FIG. 3 is a block diagram illustrating a hardware configuration of the POS terminal 10. The POS terminal 10 includes, as illustrated in FIG. 3, a CPU (Central Processing Unit) 21, a ROM (Read Only Memory) 22, a RAM (Random Access Memory) 23, and a memory unit 24. The CPU 21 is an example of a processor and is a control entity. The ROM 22 stores various programs. Various data are loaded in the RAM 23. The memory unit 24 stores various programs. The CPU 21, the ROM 22, the RAM 23, and the memory unit 24 are connected to one another via a data bus 25. The CPU 21, the ROM 22, the RAM 23, and the memory unit 24 configure a control unit 100. That is, the CPU 21 operates according to a control program stored in the ROM 22 or the memory unit 24 and loaded in the RAM 23, whereby the control unit 100 executes control processing for the POS terminal 10 explained below.

The RAM 23 stores information to be displayed on the display unit for store clerks 13 and the display unit for customers 14, commodity information read from a commodity master stored in the memory unit 24 and loaded based on a commodity code read by the reading unit 17, and the like.

The memory unit 24 is a HDD (Hard Disk) or a nonvolatile memory in which stored information is retained even if power is turned off and includes a program unit 241, a flag unit 242, and a switching time unit 243. In the flag unit 242, information of a flag indicating whether information is divided and displayed or scrolled and displayed is stored. The information of the flag stored in the flag unit 242 can be changed. The switching time unit 243 stores a predetermined time indicating a time until the information to be divided and displayed is switched from display of first information to display of second information. The predetermined time stored in the switching tie unit 243 can be set and changed.

A controller 26 is connected to the operation unit 11, the printing unit 12, the display unit for store clerks 13, the display unit for customers 14, and the reading unit 17 and executes control for the units based on a command from the control unit 100. The operation unit 11 includes a closing key 111. The closing key 111 is operated if settlement processing is executed for a commodity subjected to commodity registration processing.

Figure 4:
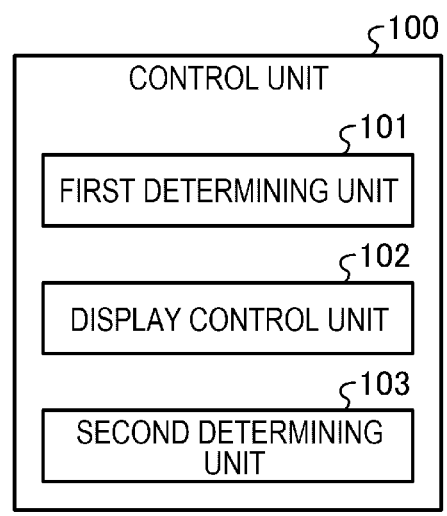
FIG. 4 is a functional block diagram illustrating a functional configuration of the POS terminal.

Subsequently, a functional configuration of the POS terminal 10 in the embodiment is explained. FIG. 4 is a functional block diagram illustrating the functional configuration of the POS terminal 10. The CPU 21 operates according to a control program stored in the ROM 22 or the program unit 241 of the memory unit 24, whereby the control unit 100 of the POS terminal 10 functions as first determining means 101, display control means 102, and second determining means 103.

The first determining means 101 has a function of determining whether the number of characters of information that should be displayed in one row exceeds the number of characters that can be displayed in one row of the display unit for customers 14. Specifically, the first determining means 101 determines whether the number of characters of the information that should be displayed in one row exceeds a predetermined number of characters stored in the memory unit 24. Note that the number of characters that can be displayed in one row of the display unit for customers 14 is different depending on a size of characters to be displayed and an interval among the characters to be displayed. Therefore, predetermined numbers of characters may be stored for each of sizes of characters and each of intervals of the characters in the memory unit 24. For example, a matrix-like table in which sizes of characters are represented on X axes and character intervals are represented on Y axes may be created in the memory unit 24 and respective predetermined numbers of characters based on the size of the characters and the character interval may be stored in intersections of the X axes and the Y axes. The first determining means 101 specifies a predetermined number of characters based on a size of characters and a character interval and determines, based on the specified predetermined number of characters, whether the number of characters of the information that should be displayed in one row exceeds the number of characters that can be displayed in one row.

The display control means 102 has a function of, if the first determining means 101 determines that the number of characters of the information that should be displayed in one row exceeds the number of characters that can be displayed in one row of the display unit for customers 14, simultaneously displaying, among information that should be displayed in one row, first information 1421 (see FIG. 7) including the number of characters (a predetermined number of characters) that can be displayed in one row of the display unit for customers 14 and a mark 144 (see FIG. 7) indicating that second information that cannot be fully displayed in the first information 1421 is present, and, after displaying the first information 1421 for the predetermined time, instead of the display of the first information 1421 and the mark 144, displaying the remaining second information 1422 that was not successfully displayed as the first information among the information that should be displayed in one row. Specifically, the display control means 102 has a function of, if determining that the number of characters of the information that should be displayed in one row exceeds the predetermined number of characters, simultaneously displaying, in the display region A of the display unit for customers 14, the first information 1421 and the mark 144 indicating that the second information 1422 that should be further displayed in the same row is present and, after displaying the first information for the predetermined time, displaying the second information 1422 instead of the first information 1421 and the mark 144. Note that, in this embodiment, the number of characters of the first information is one character less than the number of characters (the predetermined number of characters) that the display unit for customers 14 can display. The number of characters of the first information added with the mark 144 is the number of characters (the predetermined number of characters) that the display unit for customers 14 can display.

The second determining means 103 has a function of, if the first determining means 101 determines that the number of characters of the information that should be displayed in one row exceeds the number of characters that can be displayed in one row of the display unit for customers 14, determining whether the display control means 102 divides information that should be displayed in one row into first information and second information and displays the information or scrolls the information in a row direction and displays the information. Specifically, the second determining means 103 has a function of, if the first determining means 101 determines that the number of characters of the information that should be displayed in one row exceeds the number of characters that can be displayed in one row (the predetermined number of characters), determining, based on a flag stored in the flag unit 242, whether the display control means 102 divides the information that should be displayed in one row into first information and second information and displays the information or scrolls the information in the row direction and displays the information. If the flag stored in the flag unit 242 is, for example, "0", the second determining means 103 determines that the display control means 102 divides the information that should be displayed in one row into the first information and the second information and displays the information. If the flag stored in the flag unit 242 is, for example, "1", the second determining means 103 determines that the display control means 102 scrolls the information that should be displayed in one row in the row direction and displays the information.

Figure 5:
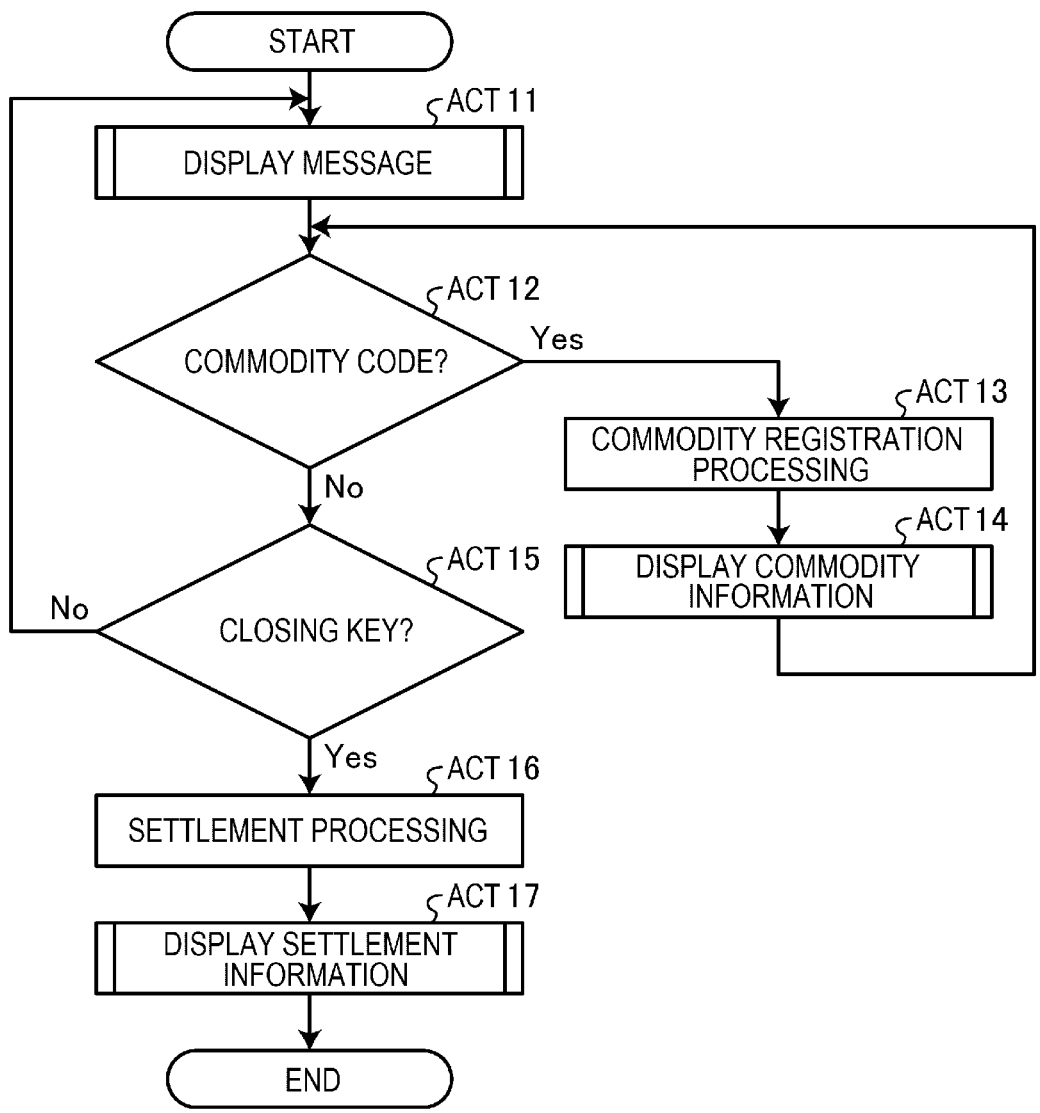
FIG. 5 is a flowchart illustrating a flow of control processing of the POS terminal.

Subsequently, control for the POS terminal 10 is explained. FIG. 5 is a flowchart illustrating a flow of control processing for the POS terminal 10. As illustrated in FIG. 5, the control unit 100 of the POS terminal 10 displays messages to a customer on the display unit for customers 14 before starting a transaction with the customer (ACT 11). The messages to the customer are, for example, two types of "Hello, welcome to the ABC store" and "Today is a bargain day !!". The control unit 100 displays the message "Hello, welcome to the ABC store" in the display region A. The control unit 100 displays the message "Today is a bargain day!!" in the display region A. If displaying the messages in ACT 11, the control unit 100 performs control based on a flowchart of FIG. 6 in relation to a method of display on the display unit for customers 14.

Figure 6:
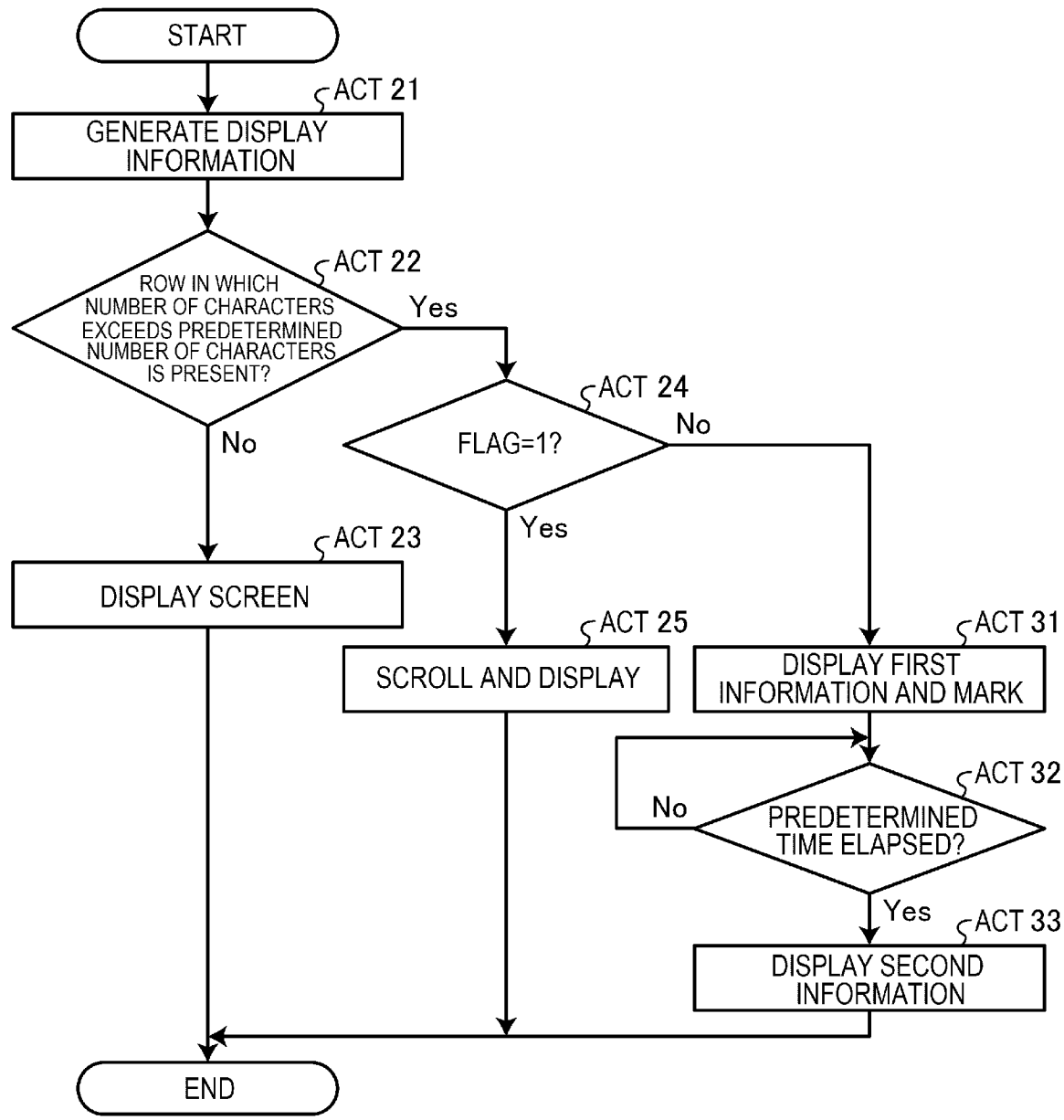
FIG. 6 is a flowchart illustrating a flow of display control processing of the POS terminal.

In FIG. 6, the control unit 100 generates, for each of rows, messages to be displayed on the display unit for customers 14 (ACT 21). If messages to be displayed on the display unit for customers 14 are stored in advance, the control unit 100 reads the messages in ACT 21. The control unit 100 grasps, based on the generated (or read) messages, for each of the rows, contents of characters to be displayed in the rows of the display unit for customers 14 and the numbers of characters. Note that the control unit 100 also grasps information concerning sizes of generated characters and character intervals.

Subsequently, the first determining means 101 determines, for each of the rows of the display unit for customers 14, whether the numbers of characters of the generated messages exceed a predetermined number of characters (ACT 22). The first determining means 101 compares, for each of the rows, the grasped numbers of characters and the predetermined number of characters that can be displayed in one row stored in the memory unit 24 and determines, for each of the rows, whether the numbers of characters of the generated messages exceed the predetermined number of characters. In the case of the embodiment, the first determining means 101 determines, respectively for a message 142 (information that should be displayed in one row) to be displayed in the display region A and a message 143 (information that should be displayed in one row) to be displayed in the display region B, whether the numbers of characters exceed the predetermined number of characters.

The first determining means 101 determines that the numbers of characters of the messages do not exceed the predetermined number of characters in all of the rows (No in ACT 22), the display control means 102 displays the generated messages in the rows of the display unit for customers 14 (ACT 23).

If the first determining means 101 determines that there is a row in which the number of characters of the generated message exceeds the predetermined number of characters (Yes in ACT 22), subsequently, the second determining means 103 determines whether the flag stored in the flag unit 242 is "0" or "1" (ACT 24). If the second determining means 103 determines that the flag stored in the flag unit 242 is "1" (Yes in ACT 24), for the row in which the number of characters is determined as exceeding the predetermined number of characters, the display control means 102 displays the message to be displayed in the row while scrolling the message in the row direction (ACT 25). For the rows in which the numbers of rows are determined as not exceeding the predetermined number of characters, the display control means 102 displays the messages in the rows (ACT 25).

In the case of the embodiment, the number of characters of the message 142 "Hello, welcome to the ABC store" to be displayed in the display region A exceeds the predetermined number of characters that the display region A can display. Therefore, the display control means 102 displays the message while scrolling (scrolling from the right side to the left side) the message in the row direction (the left-right direction in FIG. 2) (ACT 25). As a method of the scroll, first, the message "Hello, welcome" that can be displayed in the display region A at a time may be displayed and the remaining "to the ABC store" may be displayed while being scrolled from the right to the left or all of "Hello, welcome to the ABC store" may be displayed to be scrolled from the right to the left.

If the second determining means 103 determines that the flag stored in the flag unit 242 is "0" (No in ACT 24), the display control means 102 displays that first information 1421 that can be displayed in the row (ACT 31). In the case of the embodiment, the display control means 102 displays "Hello, welcome to the ABC store", which is the first information 1421, in the display region A. The message 143 "Today is a bargain day!!" is displayed in the display region B.

The display control means 102 displays the mark 144 indicating that the second information 1422 that should be displayed is present other than the first information 1421. The mark 144 is displayed in the same row as the row in which the first information 1421 is displayed and in the position at the end of the first information 1421. Note that, since the mark 144 indicates that the second information other than the first information 1421 is present, the mark 144 does not always have to be displayed in the same row as the row of the first information 1421. The mark 144 does not always have to be displayed in the position at the end of the first information 1421. For a row in which the number of characters of the information that should be displayed in one row does not exceed the number of characters that can be displayed in one row, the message is displayed in the row. In the embodiment, the mark 144 indicating that the second information 1422 is present is displayed in the position at the end of the message "Hello, welcome", which is the first information 1421 displayed in the display region A.

Figure 7:
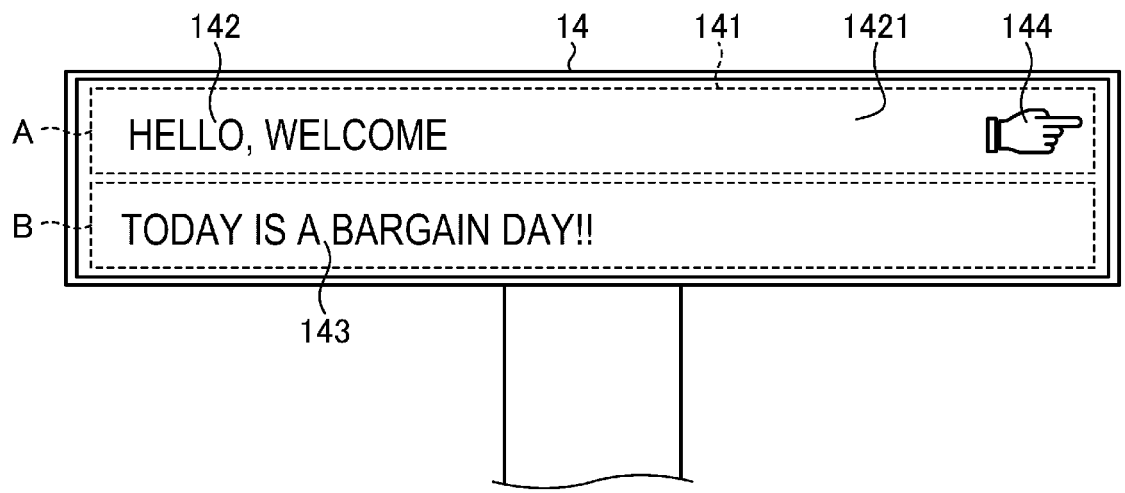
FIG. 7 is a diagram illustrating a display example of the display unit for customers.

The message that the display control means 102 displays on the display unit for customers 14 in ACT 31 is illustrated in FIG. 7. As illustrated in FIG. 7, the first information 1421 "Hello, welcome" to be displayed first in the message 142 "Hello, welcome to the ABC store" is displayed in the display region A. A finger-shaped mark 144 indicating that the second information is further present is displayed in the position at the end of the first information 1421 in the display region A. Note that the mark 144 only has to be a mark indicating that the second information 1422 is further present and is not limited to the finger shape. For example, the mark 144 may be a star-shaped or asterisk mark. The message 143 "Today is a bargain day!!" is displayed in the display region B. Note that, since the number of characters of the message 143 to be displayed in the display region B does not exceed the predetermined number of characters, a mark indicating that the second information 1422 is present is not displayed in the position at the end of the message 143.

Referring back to FIG. 6, subsequently, the control unit 100 starts a not-illustrated timer and determines whether the predetermined time stored in the switching time unit 243 elapsed (ACT 32). The control unit 100 stays on standby until the predetermined time elapses (No in S32). While the control unit 100 stays on standby, the display control means 102 continues to display the first information 1421 and the mark 144.

If the control unit 100 determines that the predetermined time elapsed (that is, the first information is displayed for the predetermined time) (Yes in ACT 32), the display control means 102 hides the first information 1421 and the mark 144 displayed in the display region A and displays the second information instead (ACT 33). The message 143 displayed in the display region B is continuously displayed.

Figure 8:
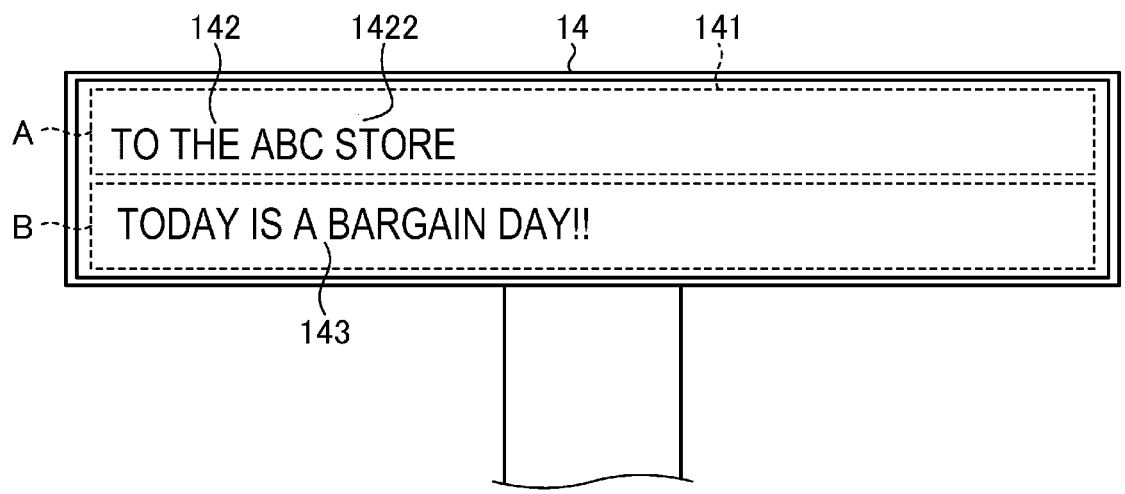
FIG. 8 is a diagram illustrating a display example of the display unit for customers.

The message that the display control means 102 displays on the display unit for customers 14 in ACT 33 is illustrated in FIG. 8. As illustrated in FIG. 8, the second information 1422 "to the ABC store" in the message 142 "Hello, welcome to the ABC store" is displayed in the display region A. The finger-shaped mark 144 indicating that the second information 1422 is further present is not displayed in the position at the end of the second information 1422 in the display region A. Note that the message 143 "Today is a bargain day!!" is continuously displayed in the display region B.

Referring back to FIG. 5, subsequently, the control unit 100 determines, based on the symbol read by the reading unit 17, whether a commodity code is acquired (ACT 12). If determining that a commodity code is acquired (Yes in ACT 12), the control unit 100 executes, based on the acquired commodity code, commodity registration processing relating to the commodity (ACT 13). The control unit 100 displays commodity information of the commodity subjected to the commodity registration processing on the display unit for store clerks 13 and the display unit for customers 14 (ACT 14). If displaying the commodity information on the display unit for customers 14 in ACT 14, for example, the control unit 100 displays commodity information (a commodity name, a price of the commodity, and the like) in the display region A and displays a total amount of commodities subjected to commodity registration processing to that point. The control unit 100 performs the same processing as the processing in ACT 11 (that is, performs the processing illustrated in FIG. 6) on information to be displayed in the display region A and the display region B and, if the number of characters of the information that should be displayed exceeds the number of characters that can be displayed on the display unit for customers 14, the control unit 100 divides display relating to the row into display of first information and a mark and the following display of second information and displays the information. The control unit 100 returns to ACT 12. Every time a new commodity code is acquired, the control unit 100 performs the processing in ACT 12 to ACT 14.

If determining that a commodity code is not acquired (No in ACT 12), the control unit 100 determines whether the closing key 111 was operated (ACT 15). If determining that the closing key 111 was operated (Yes in ACT 15), the control unit 100 executes settlement processing relating to the commodity subjected to the commodity registration processing in the transaction (ACT 16). The control unit 100 displays settlement information of the settlement processing on the display unit for store clerks 13 and the display unit for customers 14 (ACT 17). If displaying the settlement information on the display unit for customers 14 in ACT 17, for example, the control unit 100 displays information concerning an amount to be paid by the customer in the display region A and displays deposit amount and change information in the display region B. The control unit 100 performs the same processing as the processing in ACT 11 (that is, the processing illustrated in FIG. 6) on the information to be displayed in the display region A and the display region B. If the number of characters of information that should be displayed exceeds the number of characters that can be displayed on the display unit for customers 14, the control unit 100 divides the display relating to the row into display of first information and a mark and the following display of second information and displays the information. The control unit 100 ends the processing.

If determining that the closing key 111 is not operated (No in ACT 15), the control unit 100 returns to ACT 11.

As explained above, the POS terminal 10 in the embodiment includes the display unit for customers 14 that displays information, the first determining means 101 that determines whether the number of characters of information that should be displayed in one row exceeds the number of characters that can be displayed in one row of the display unit for customers 14, and the display control means 102 that, if the first determining means 101 determines whether the number of characters of the information that should be displayed in one row exceeds the number of characters that can be displayed in one row of the display unit for customers 14, simultaneously displays the first information 1421 that can be displayed in one row of the display unit for customers 14 and the mark 144 indicating that the second information 1422 that should be further displayed in the same row is present and, after displaying the first information 1421 for the predetermined time, displays the second information 1422 instead of the first information 1421 and the mark 144.

With the POS terminal 10 in the embodiment explained above, if there is a row in which the number of characters of information to be displayed on the display unit for customers 14 exceeds the number of characters that can be displayed on the display unit for customers 14, first, the first information 1421 is displayed in the row, the mark 144 indicating that the second information 1422 relating to the information is present is displayed in the position at the end of the first information 1421 in the same row, and, after the predetermined time elapses, the second information 1422 is displayed in the same row instead of the first information 1421 and the mark 144. Therefore, it is possible to legibly display information, the number of characters of which exceeds the number of characters that can be displayed at a time on the display unit for customers 14.

With the POS terminal 10 in the embodiment, it is possible to set the predetermined time in the switching time unit 243 and change the predetermined time. Therefore, by setting or changing a predetermined time optimum for the store, it is possible to legibly display information, the number of characters of which exceeds the number of characters that can be displayed at a time on the display unit for customers 14.

In the POS terminal 10 in the embodiment, the display control means 102 further has a function of, if the first determining means 101 determines that the number of characters of the information that should be displayed in one row exceeds the number of characters that can be displayed in one row of the display unit for customers 14, scrolling the information that should be displayed in one row in the row direction and displaying the information. The POS terminal 10 further includes the second determining means 103 that, if the first determining means 101 determines that the number of characters of the information that should be displayed in one row exceeds the number of characters that can be displayed in one row of the display unit for customers 14, determines, based on information of a set flag, whether the information that the display control means 102 should display in one row is displayed as the first information 1421 and the second information 1422 or scrolled in the row direction and displayed. If the second determining means 103 determines that the information that should be displayed in one row is displayed as the first information 1421 and the second information 1422, the display control means 102 simultaneously displays the first information 1421 that can be displayed in one row of the display unit for customers 14 and the mark 144 indicating that the second information 1422 that should be further displayed in the same row is present and, after displaying the first information 1421 for the predetermined time, displays the second information 1422 instead of the first information 1421 and the mark 144. If the second determining means 103 determines that the information that should be displayed in one row is scrolled in the row direction and displayed, the display control means 102 scrolls the information that should be displayed in one row in the row direction and display the information.

With the POS terminal 10 in the embodiment explained above, if the number of characters of information to be displayed exceeds the number of characters that can be displayed in one row of the display unit for customers 14, it is possible to display the first information 1421 and the mark 144 and, thereafter, change the setting of the flag to designate whether the second information 1422 is displayed or the information to be displayed is scrolled and displayed.

Note that the embodiment is presented as an example and is not intended to limit the scope of the disclosure. The new embodiment can be implemented in other various forms. Various omissions, substitutions, and changes can be performed in a range not departing from the gist of the disclosure. The embodiment and modifications thereof are included in the scope and the gist of the disclosure and included in the disclosure described in the claims and a scope of equivalents of the disclosure.

For example, in the embodiment, the display unit for customers 14 is explained as an example of the display unit. However, not only this, but the display unit for store clerks 13 may be set as the display unit. The display unit for store clerks 13 and the display unit for customers 14 may be set as the display unit.

In the embodiment, if the number of characters of the information to be displayed exceeds the number of characters that can be displayed in one row of the display unit for customers 14, the first information 1421 and the mark 144 are displayed and, thereafter, it is possible to designate whether the second information 1422 is displayed or the information to be displayed is scrolled and displayed. However, this designating function is not essential.

A program to be executed in the POS terminal 10 in the embodiment is provided by being recorded in a computer-readable recording medium such as a CD-ROM, a flexible disk (FD), a CD-R, or a DVD (Digital Versatile Disk) as a file of an installable format or an executable format.

The program to be executed in the POS terminal 10 in the embodiment may be stored on a computer connected to a network such as the Internet and provided to be downloaded through the network. The program to be executed in the POS terminal 10 in the embodiment may be provided or distributed through a network such as the Internet.

The program to be executed in the POS terminal 10 in the embodiment may be provided by being incorporated in a ROM or the like.

What is claimed is:

1. A commodity sales data processing device, comprising:
a display component configured to display information;
first determining component for determining whether a number of characters of information for display in one row exceeds a number of characters able to be displayed in one row of the display component; and display controller for, if the first determining component determines that the number of characters of the information for display in one row exceeds the number of characters able to be displayed in one row of the display component, simultaneously displaying first information that is displayable in one row of the display component and a mark indicating that second information for further display in a same row is present and, after displaying the first information for a predetermined time, displaying the second information instead of the first information and the mark.

2. The commodity sales data processing device according to claim 1, wherein the mark is displayed in the same row as the row of the displayed first information.

3. The commodity sales data processing device according to claim 2, wherein the mark is displayed in a position at an end of the displayed first information.

4. The commodity sales data processing device according to claim 1, wherein the predetermined time can be changed.

5. The commodity sales data processing device according to claim 1, wherein if the first determining component determines that the number of characters of the information for display in one row exceeds the number of characters able to be displayed in one row of the display component, the display controller scrolls the information for display in one row in a row direction and displays the information, the device further comprises second determining component for, if the first determining component determines that the number of characters of the information for display in one row exceeds the number of characters able to be displayed in one row of the display component, determining whether the display controller displays the information that should be displayed in one row as the first information and the second information or scrolls the information in the row direction and displays the information, and if the second determining component determines that the information for display in one row is displayed as the first information and the second information, the display controller simultaneously displays the first information able to be displayed in one row of the display component and a mark indicating that the second information able to be further displayed in the same row is present and, after displaying the first information for the predetermined time, displays the second information instead of the first information and the mark and, if the second determining component determines that the information that should be displayed in one row is scrolled in the row direction and displayed, the display controller scrolls the information that should be displayed in one row in the row direction and displays the information.

6. The commodity sales data processing device according to claim 1, further comprising:

a printing component configured to print commodity information and settlement information on a receipt paper.

7. The commodity sales data processing device according to claim 1, further comprising:

a reading component including a light emitting component and a light receiving component, the reading component configured to read a symbol attached to a commodity.

8. A commodity sales data processing method, comprising:

displaying information;

determining whether a number of characters of information for display in one row exceeds a number of characters able to be displayed in one row of a display component; and if determining that the number of characters of the information for display in one row exceeds the number of characters that can be displayed in one row of the display component, simultaneously displaying first information for display in one row of the display component and a mark indicating that second information that should be further displayed in a same row is present and, after displaying the first information for a predetermined time, displaying the second information instead of the first information and the mark.

9. The commodity sales data processing method according to claim 8, further comprising:

displaying the mark in the same row as the row of the displayed first information.

10. The commodity sales data processing method according to claim 9, further comprising:

displaying the mark in a position at an end of the displayed first information.

11. The commodity sales data processing method according to claim 8, further comprising:

if the number of characters of the information for display in one row exceeds the number of characters able to be displayed in one row of the display component, scrolling the information for display in one row in a row direction and displaying the information;

if the number of characters of the information for display in one row exceeds the number of characters able to be displayed in one row of the display component, determining whether the display controller displays the information that should be displayed in one row as the first information and the second information or scrolling the information in the row direction and displaying the information; and if the information for display in one row is displayed as the first information and the second information, simultaneously displaying the first information able to be displayed in one row of the display component and a mark indicating that the second information able to be further displayed in the same row is present and, after displaying the first information for the predetermined time, displaying the second information instead of the first information and the mark and, if the information that should be displayed in one row is scrolled in the row direction and displayed, scrolling the information that should be displayed in one row in the row direction and displaying the information.

12. The commodity sales data processing method according to claim 8, further comprising:

printing commodity information and settlement information on a receipt paper.

13. The commodity sales data processing method according to claim 8, further comprising:

reading a symbol attached to a commodity.

14. A point of sales terminal, comprising:

a registration component;

a settlement component;

a display component configured to display information;

first determining component for determining whether a number of characters of information for display in one row exceeds a number of characters able to be displayed in one row of the display component; and display controller for, if the first determining component determines that the number of characters of the information for display in one row exceeds the number of characters able to be displayed in one row of the display component, simultaneously displaying first information that is displayable in one row of the display component and a mark indicating that second information for further display in a same row is present and, after displaying the first information for a predetermined time, displaying the second information instead of the first information and the mark.

15. The point of sales terminal according to claim 14, wherein the mark is displayed in the same row as the row of the displayed first information.

16. The point of sales terminal according to claim 15, wherein the mark is displayed in a position at an end of the displayed first information.

17. The point of sales terminal according to claim 14, wherein the predetermined time can be changed.

18. The point of sales terminal according to claim 14, wherein if the first determining component determines that the number of characters of the information for display in one row exceeds the number of characters able to be displayed in one row of the display component, the display controller scrolls the information for display in one row in a row direction and displays the information, the device further comprises second determining component for, if the first determining component determines that the number of characters of the information for display in one row exceeds the number of characters able to be displayed in one row of the display component, determining whether the display controller displays the information that should be displayed in one row as the first information and the second information or scrolls the information in the row direction and displays the information, and if the second determining component determines that the information for display in one row is displayed as the first information and the second information, the display controller simultaneously displays the first information able to be displayed in one row of the display component and a mark indicating that the second information able to be further displayed in the same row is present and, after displaying the first information for the predetermined time, displays the second information instead of the first information and the mark and, if the second determining component determines that the information that should be displayed in one row is scrolled in the row direction and displayed, the display controller scrolls the information that should be displayed in one row in the row direction and displays the information.

19. The point of sales terminal according to claim 14, further comprising:

a printing component configured to print commodity information and settlement information on a receipt paper.

20. The point of sales terminal according to claim 14, further comprising:

a reading component including a light emitting component and a light receiving component, the reading component configured to read a symbol attached to a commodity.

\* \* \* \* \*